(12) United States Patent
Hamada et al.

(10) Patent No.: US 7,970,251 B2
(45) Date of Patent: Jun. 28, 2011

(54) OUTLET DEVICE (75) Inventors: Masahiro Hamada, Kanagawa (JP); Yoshio Ukita, Aichi (JP); Motoyoshi Kimura, Aichi (JP); Tetsuya Ohsugi, Aichi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/523,653

(22) PCT Filed: Jan. 18, 2008

(86) PCT No.: PCT/JP2008/050592
§ 371 (c)(1),
(2), (4) Date: Aug. 20, 2009

(87) PCT Pub. No.: WO2008/088036
PCT Pub. Date: Jul. 24, 2008

(65) Prior Publication Data
US 2010/0080513 A1 Apr. 1, 2010

(30) Foreign Application Priority Data

Jan. 19, 2007 (JP) .............................. P. 2007-010151

(51) Int. Cl.
G02B 6/00 (2006.01)
(52) U.S. Cl. ........................................ 385/137; 385/139
(58) Field of Classification Search .................. 385/137, 385/139
See application file for complete search history.

(56) References Cited

U.S. PATENT DOCUMENTS
7,547,844 B2 * 6/2009 Forbis .............................. 174/58

FOREIGN PATENT DOCUMENTS
| JP | 09-127369 | 5/1997 |
| JP | 09-243859 | 9/1997 |
| JP | 2001-141956 | 5/2001 |
| JP | 2003-348727 | 12/2003 |
| JP | 2004-157263 | 6/2004 |
| WO | WO 2004/031823 A1 | 4/2004 |

OTHER PUBLICATIONS

Machine Translation of Japanese Publication 9-127369 (May 1997), cited in Applicant's IDS.*

* cited by examiner

Primary Examiner — Jerry T Rahll
(74) Attorney, Agent, or Firm — McDermott Will & Emery LLP (57) ABSTRACT

An outlet device, which is to be arranged on a wall surface, includes an outlet box in which electric wiring and optical interconnection are to be accommodated, and a cover plate which covers the outlet box. The cover plate includes a plate surface formed with an opening section through which an electric connection port of at least one of a telephone jack and an electric power supply outlet is to be exposed, and a bulged portion formed, on left or right side of the plate surface, to bulge frontward from the plate surface. The bulged portion is operable to accommodate a connection adaptor to which an optical connector attached directly to an end portion of an optical fiber is fitted, and includes a bottom face formed with an opening through which an optical connection port of the connection adaptor is to be exposed so as to be oriented downward.

18 Claims, 6 Drawing Sheets

OUTLET DEVICE

RELATED APPLICATIONS

This application is the U.S. National Phase under 35 U.S.C. §371 of International Application No. PCT/JP2008/050592, filed on Jan. 18, 2008, which in turn claims the benefit of Japanese Application No. 2007-010151, filed on Jan. 19, 2007, the disclosures of which Applications are incorporated by reference herein.

TECHNICAL FIELD

The present invention relates to an outlet device which is attached to a wall surface to provide electrical and optical connection ports.

BACKGROUND ART

In recent years, in addition to an increasing speed and increasing information volume in information communications such as the Internet, optical networking for two-way communications and large-volume communications is recently developing. Data communication service using optical fibers is being introduced also in general homes, i.e., FTTH (Fiber To The Home). Thus, in addition to information communications through telephone lines using conventional conductive wires, information communications using optical fiber cables are also increasing.

Conventionally, electric power lines, telephone lines, TV signal lines and the like are coupled to various kinds of electronic devices via an outlet device attached to a wall surface. When an optical fiber cable is introduced as a new communication means, there is a need for an easy connection to an information equipment also using such an outlet device. However, in a case of optical fiber cables, there are limitations to a bend radius, etc. since they use of glass fibers, and they require an reinforcement at a coupling part between the optical fibers. Accordingly, there is a large difference in its configuration when compared with the conventional outlet devices which make connections using conductive wires.

Figure 5:
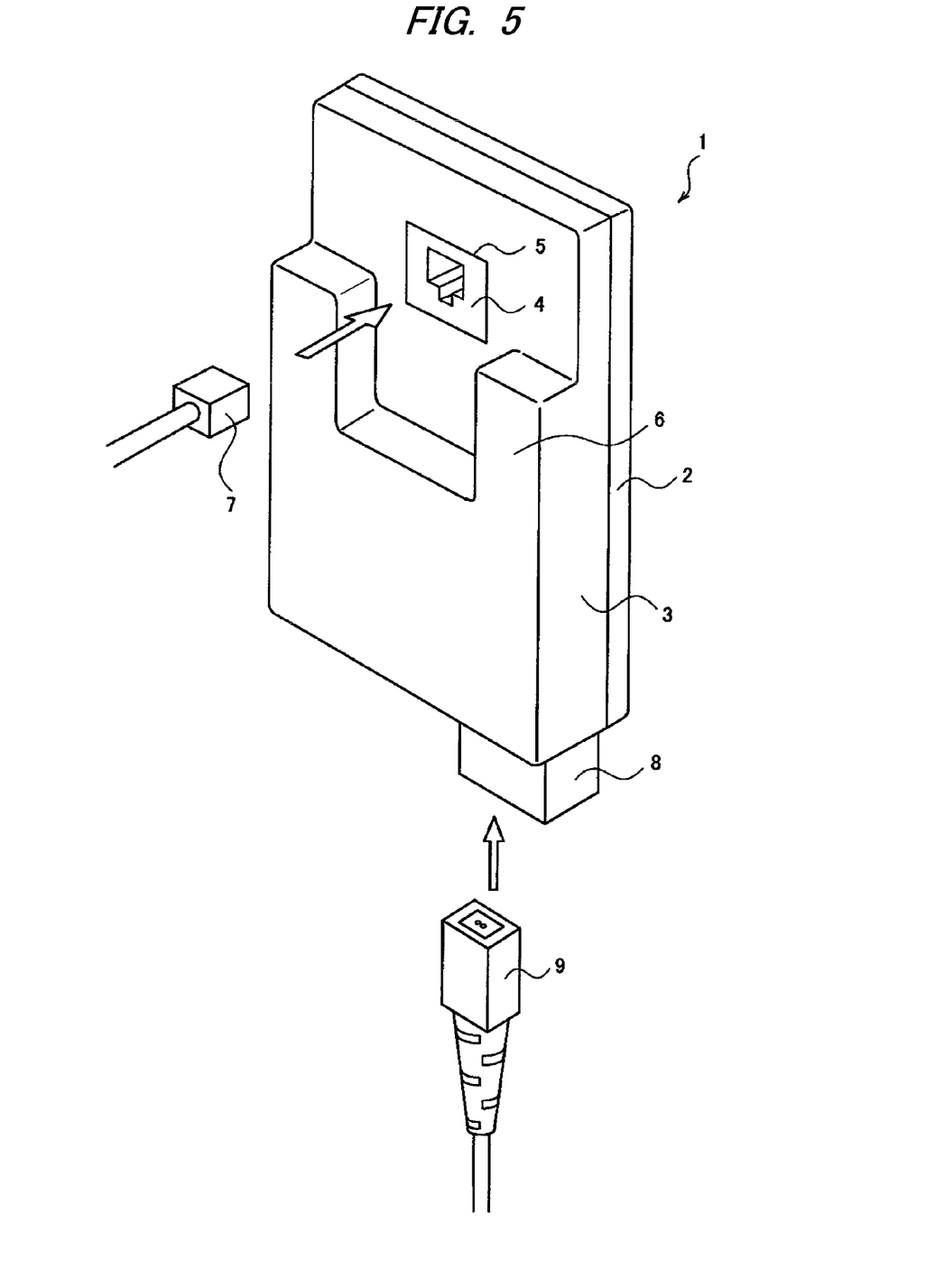
FIG. 5 is a perspective view showing an example of a conventional outlet.

For example, JP2004-157263A discloses an outlet device for coupling an optical fiber cable. FIG. 5 shows an outlet device 1 disclosed in JP2004-157263A. The outlet device 1 has an optical fiber receiving plate 2 and a cover plate 3 which are formed of synthetic resin or the like. A plate surface 6 on a front side of the cover plate 3 is formed with a connection port for electric connection. For example, the connection port is configured such that a telephone jack 4 is attached to be exposed from a receptacle hole 5. A telephone plug 7 is coupled to the connection port from the front of the plate surface 6. An optical connector coupling adaptor 8 is attached to a lower portion of the outlet device 1 such that an optical connection port of the optical connector coupling adaptor 8 is oriented downward. An optical connector plug 9 is inserted and coupled to the connection port of the optical connector coupling adaptor 8 from below and in a direction parallel to the plate surface 6.

Figure 6:
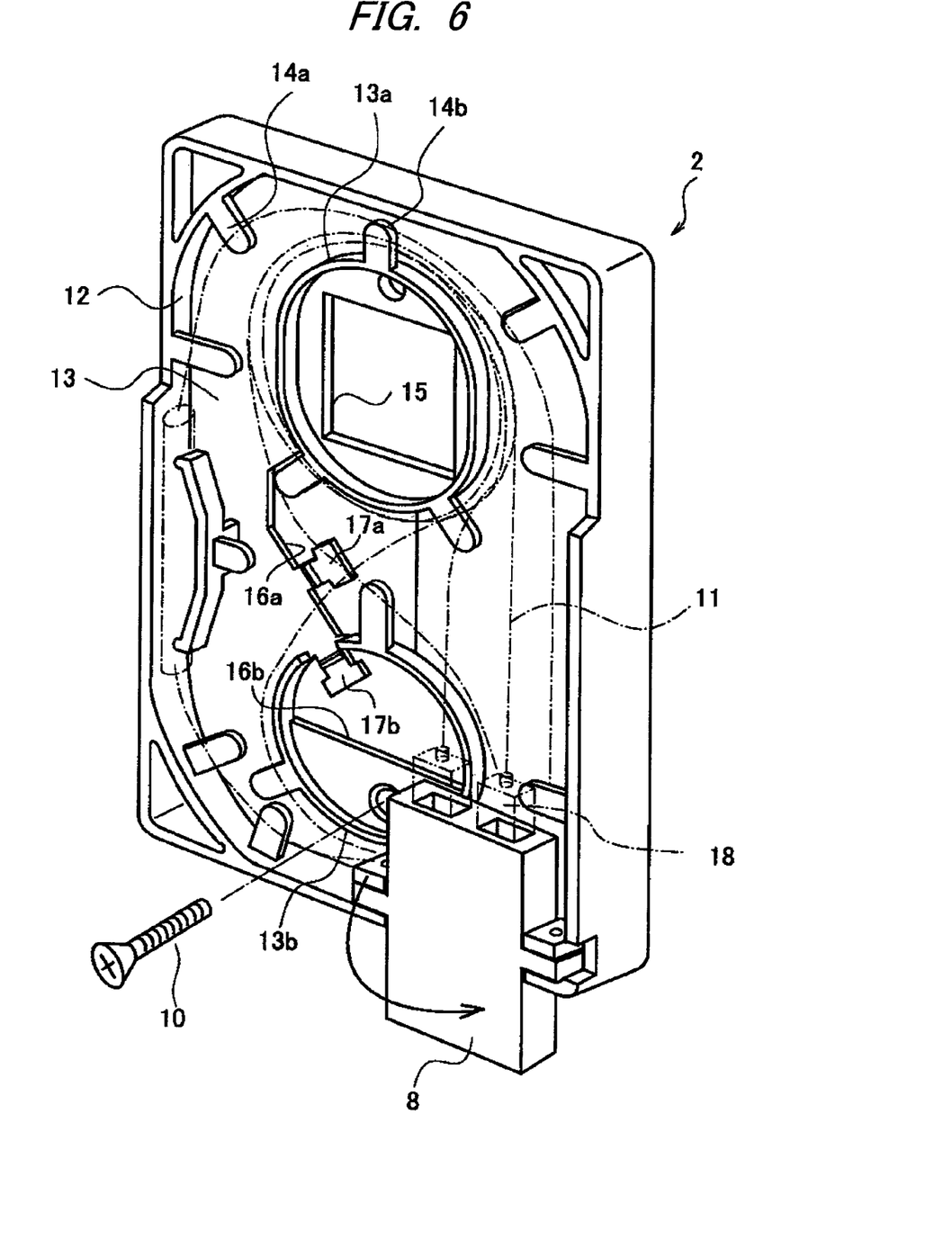
FIG. 6 is a perspective view illustrating a conventional optical fiber receiving plate.

FIG. 6 shows an example of a configuration of the optical fiber receiving plate 2. The optical fiber receiving plate 2 is attached to a face of an outlet box or the like with a fixing screw 10. A single-fiber or multi-fiber cable led out from the inside of the wall is fixed to the optical fiber receiving plate 2, and a coated optical fiber 11 exposed from the optical fiber cable is accommodated in the optical fiber receiving plate 2. The optical fiber receiving plate 2 is formed by integrally molding a bottom wall 13 and a side wall 12. Circular annular walls 13a, 13b are provided integrally with a central portion of the bottom wall 13. The annular walls 13a, 13b guide the coated optical fiber 11 such that the coated optical fiber 11 is accommodated in a looped manner.

A plurality of optical fiber holding pieces 14a, 14b are provided at suitable intervals integrally with the side wall 12 and the annular walls 13a, 13b. A receptacle hole 15 for the telephone jack 4 is formed on an inner side the annular wall 13a. Cutout holes 16a, 16b through which the optical fiber cable is led out from the inside of the wall toward the front side of the optical fiber receiving plate 2 are formed in the central portion of the bottom wall 13. Optical fiber fixing pieces 17a, 17b are provided integrally with the bottom wall 13 so as to protrude into the cutout holes 16a, 16b respectively. The optical fiber cable is anchored to one of the optical fiber fixing pieces 17a, 17b. A surplus length of the coated optical fiber 11 exposed from the optical fiber cable is accommodated in a looped manner inside the optical fiber receiving plate 2. An optical connector 18 is attached to an end portion of the coated optical fiber 11, and the optical connector 18 is fitted to the optical connector coupling adaptor 8.

As described above, the optical fiber cable, such as a drop optical cable or an indoor optical cable, led indoors is held by the optical fiber fixing piece 17a, 17b. After that, the coated optical fiber 11 is exposed from the optical fiber cable so as to ensure a certain surplus length. The optical connector 18 is attached to the end portion of the coated optical fiber 11, and an optical connection port to the outside is provided via the optical connector coupling adaptor 8. It is therefore necessary to ensure a space for accommodating the surplus length of the coated optical fiber 11 and a coupling portion of the coated optical fiber 11 by using the optical fiber receiving plate 2. It is also necessary to remove a cable sheath to expose the coated optical fiber 11 and to perform an optical fiber connection work.

On the other hand, in recent years, a technique for attaching an optical connector directly to an optical fiber cable for indoor interconnection is also being developed. In a case in which this optical connector is used for the optical interconnection in the outlet device 1 described above, the optical connector can be attached directly to an optical fiber cable led into the optical fiber receiving plate. Accordingly, it becomes unnecessary to perform a connection work between coated optical fibers, becomes possible to accommodate the surplus length of the coated optical fiber in another place, for example, in the inside of the wall. That is, a space inside the outlet device for accommodating an optical fiber can be reduced to a required minimum, and a workload for optical interconnection can be relieved.

However, a drop optical cable or an indoor optical cable to be laid indoors usually has tension members arranged on respective sides of its coated optical fiber, and a section of a cable sheath is rectangular. Therefore, the optical cable is rigid and has directionality in its bending direction. Further, the optical connection port to an external optical fiber cable is required to be configured in a downwardly oriented manner. Thus, a composite outlet device having an electric connection port for electric power, telephone, etc. becomes large in profile that is protrudes from the wall surface. Consequently, there has been a problem that it is likely to be externally damaged and looks poor in appearance.

DISCLOSURE OF INVENTION

The present invention has been made in view of the foregoing circumstances, and it is an object thereof to provide a easy-to-handle composite outlet device in which an optical fiber cable inside a wall can be directly connected to an optical connection port without giving influence to an electric connection port for electric power or a telephone.

According to an embodiment of the present invention, an outlet device, which is to be arranged on a wall surface, includes an outlet box in which an electric wiring and an optical interconnection are to be accommodated, and a cover plate which covers the outlet box. The cover plate includes a plate surface formed with an opening section through which an electric connection port of at least one of a telephone jack and an electric power supply outlet is to be exposed, and a bulged portion formed, on either left or right side of the plate surface, to bulge frontward from the plate surface. The bulged portion is operable to accommodate a connection adaptor to which an optical connector, which is attached directly to an end portion of an optical fiber, is fitted, and includes a bottom face formed with an opening through which an optical connection port of the connection adaptor is to be exposed so as to be oriented downward.

Other aspects and advantages of the present invention will be apparent from the following description, the drawings, and the claims.

BEST MODE FOR CARRYING OUT THE INVENTION

Hereinafter, embodiments of the present invention will be described in detail with reference to the drawings.

Figure 1:
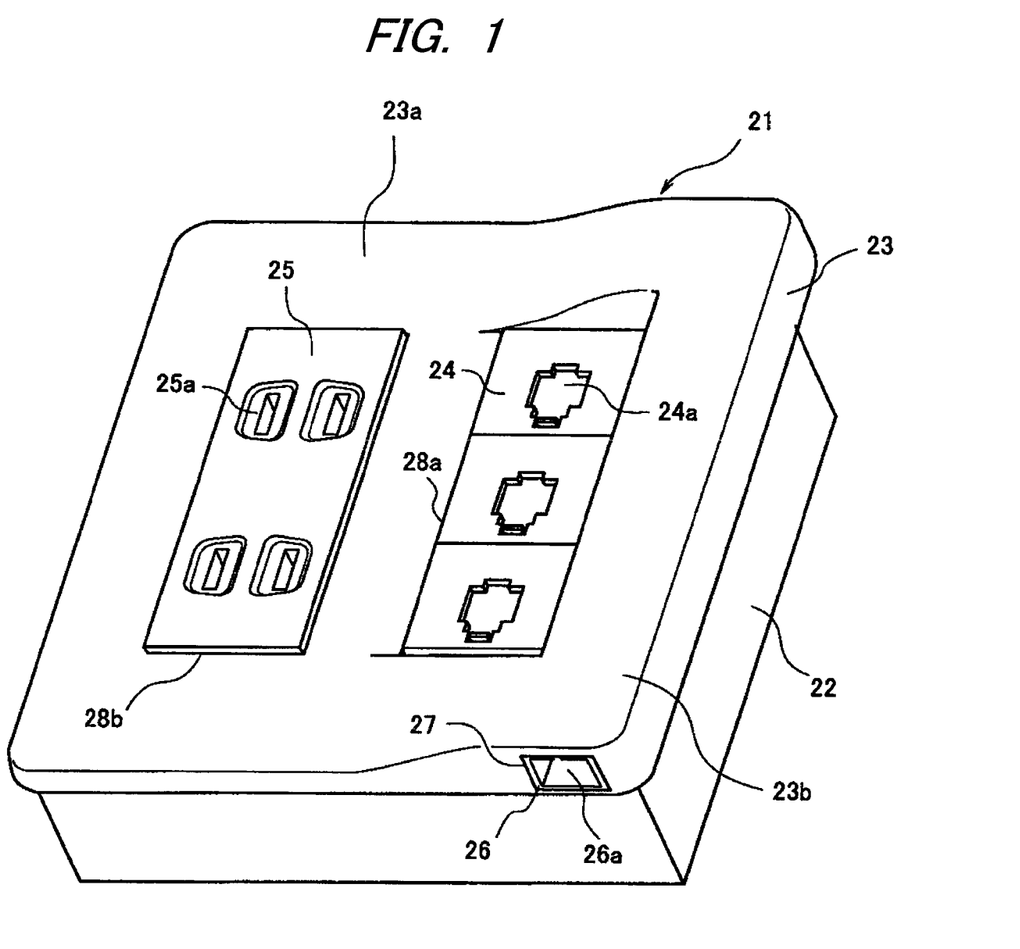
FIG. 1 is a perspective view of an outlet device according to an embodiment of the present invention.

As shown in FIG. 1, an outlet device 21 includes an outlet box 22 which is to be embedded in a wall, a mounting frame 30 (see FIG. 2) which is fixedly attached to a front portion of the outlet box 22, and a cover plate 23 which covers the mounting frame 30. The cover plate 23 has a plate surface 23a which is formed with an opening section 28a and another opening section 28b. In the outlet device 21, for example, three telephone jacks 24 are arranged to be exposed from the opening section 28a, and an electric power supply outlet 25 having two receptacles is arranged to be exposed from the opening section 28b. An electric connection port 24a is formed in each of the telephone jacks 24, and electric connection ports 25a are formed in the electric power supply outlet 25. The telephone jacks 24 and the electric power supply outlet 25 are provided such that telephone plugs and electric power plugs are inserted into the respective electric connection ports 24a, 25a in a direction perpendicular to the plate surface 23a.

A bottom face of the cover plate 23 is formed with an opening 27 through which an optical connection port 26a of a connection adaptor 26 is exposed. An optical connector plug is upwardly inserted into the connection port 26a from below the cover plate 23. Therefore, a connection portion of the optical connector plug does not largely protrude from the front face of the cover plate 23. In addition, because a fiber cord, to which the optical connector plug is attached, is extends downward, an excessive bending is not generated in the fiber cord.

However, the connection adaptor 26 and an optical connector 33 fitted into the connection adaptor 26 protrude from a front face of the mounting frame 30. Therefore, the cover plate 23 has a bulged portion 23b to accommodate the connection adaptor 26 and the optical connector 33. The bulged portion 23b is formed, on a side of either the opening section 28a or the opening section 28b of the cover plate 23, to extend from a lower end and an upper end of the cover plate 23, and has a configuration which slightly protrudes from the plate surface 23a.

Each of the top face and the bottom face of the bulged portion 23b is formed with the opening 27 through which the optical connection port 26a of the connection adaptor 26 is to be exposed. Therefore, by turning the cover plate 180 degrees, it is possible to switch the location of the connection adaptor 26 between right and left. As shown in FIG. 3B, when the opening 27 or the opening section 28a, 28b is not being used, the opening 27 or the opening section 28a, 28b may be covered by a blocking plate 27a, 29, which can be easily cut with a cutter or the like.

In the embodiment shown in FIG. 1, three electric connection ports 24a for telephone cords and two electric connection ports 25a for electric power cords are provided, and two opening sections 28a, 28b are formed in the cover plate 23. However, more electric connection ports 24a, 25a may be provided, and the number of opening sections may be more than two. Alternatively, only the electric connection ports 24a for telephone cords or the electric connection ports 25a for electric power cords may be provided, or one electric connection port 24a and one electric connection port 25a may be put together to provide a single opening section in the front face of the cover plate 23.

Figure 2:
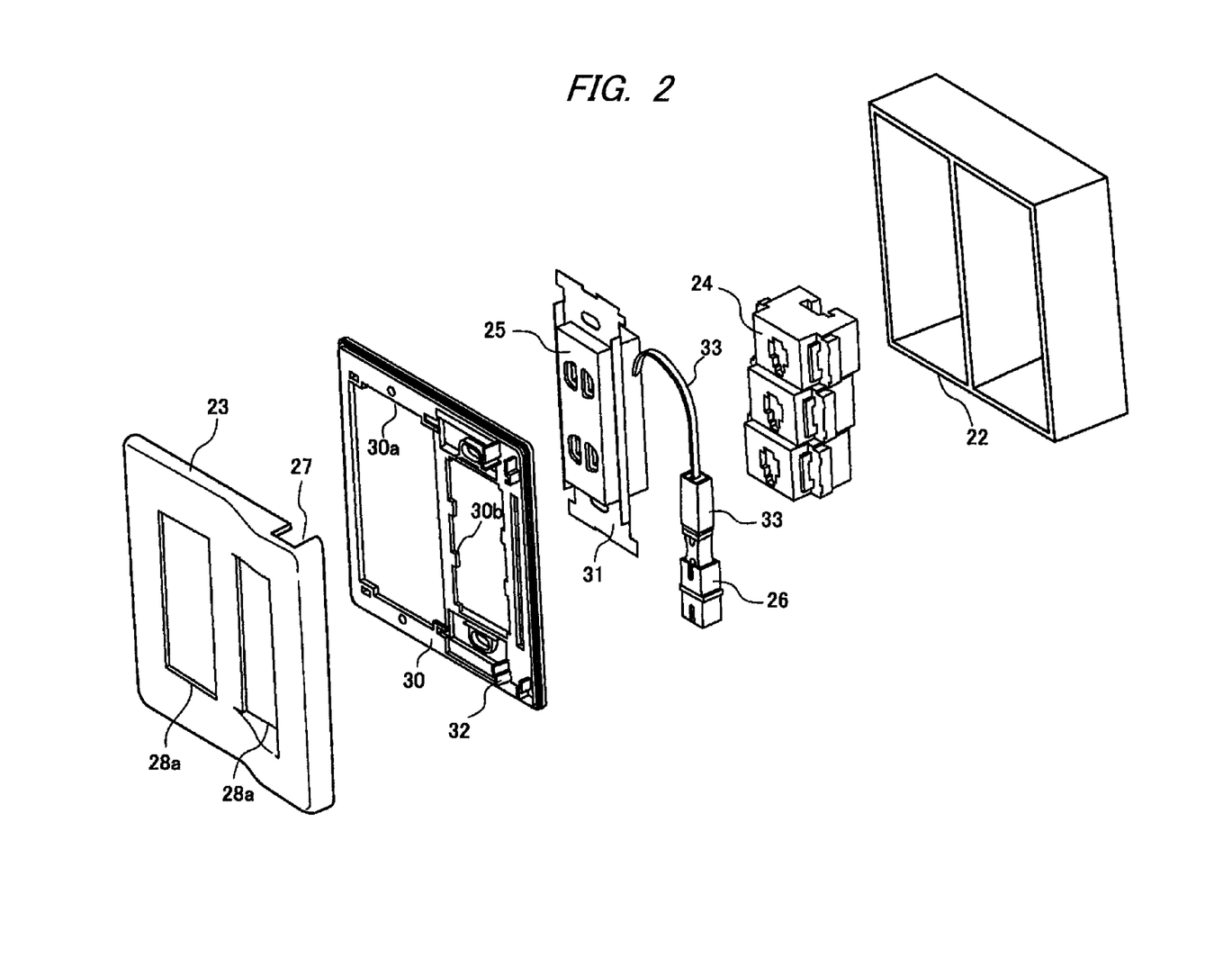
FIG. 2 is an exploded perspective view of the outlet device.

The mounting frame 30 is formed of metal or resin. As shown in FIG. 2, the mounting frame 30 includes, for example, an outlet mounting portion 30a to which the electric power supply outlet 25 is to be attached, and a jack mounting portion 30b to which the telephone jacks 24 is to be attached directly. The electric power supply outlet 25 may be attached to the outlet mounting portion 30a via a mounting bracket 31. General-purpose ones may be used as the mounting bracket 31, the electric power supply outlet 25 and the telephone jacks 24. A connection adaptor mounting portions 32 are provided at upper and lower locations on one side end portion of the mounting frame 30 to hold the connection adaptor 26. The connection adaptor mounting portions 32 may be formed in one piece together with the mounting frame 30. When assembling the outlet device 21, the connection adaptor 26 is attached to one of the connection adaptor mounting portions 32 that will be located on the lower side. An optical connector 33 terminating an end portion of an optical fiber cable 34 is fitted to an inner connection port of the connection adaptor 26.

The outlet box 22 is formed of metal or resin. The outlet box 22 is placed to be embedded into the wall. An electric power cable led out from the inside of the wall is accommodated in the outlet box 22 so as to be electrically connectable to the electric power supply outlet 25. A telephone cable led out from the inside of the wall is accommodated in the outlet box 22 so as to be electrically connectable to the telephone jacks 24. The optical connector is attached to the end portion of the optical fiber cable led out from the inside of the wall.

The optical connector is fitted to the connection adaptor 26. The mounting frame 30 is fixedly attached to a front opening section of the outlet box 22.

Electric connection portions of the telephone jacks 24 and the electric power supply outlet 25 protruding from the back surface of the mounting frame 30, and the electric cables connected to the electric connection portions are accommodated in the outlet box 22. A surplus length portion of the optical fiber cable 34 is pushed back into the wall, and is accommodated by using a space inside the wall. The cover plate 23 serves as a face plate to cover and hide the connection portions. The telephone jacks 24, the electric power supply outlet 25 and the connection adaptor 26 are exposed respectively from the opening sections 28a, 28b and the opening 27 of the cover plate 23 so that telephone plugs, electric power plugs and an optical connector plug can be connected thereto.

Figure 3A:
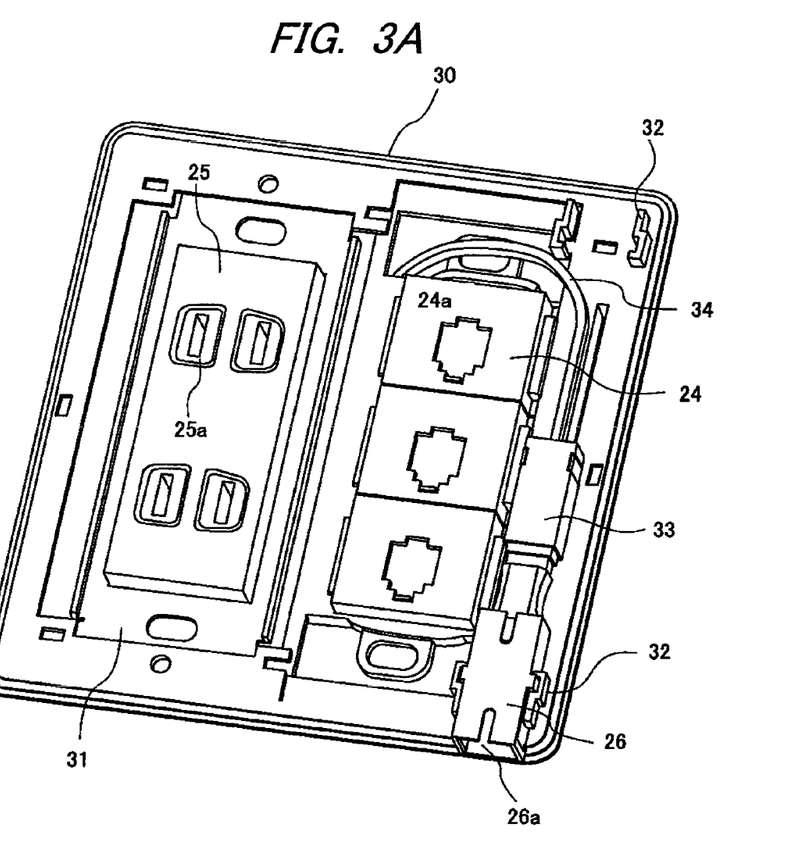
FIG. 3A is a perspective view showing an assembled state of the outlet device.
Figure 3B:
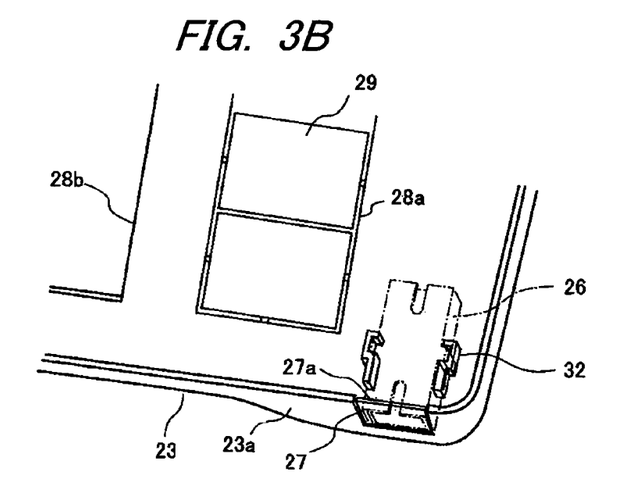
FIG. 3B is a partially enlarged view of a cover plate of an outlet device according to another embodiment of the present invention.

FIG. 3A shows a state in which the telephone jacks 24, the electric power supply outlet 25 and the connection adaptor 26 are supported on the mounting frame 30. The electric power supply outlet 25 has two electric connection ports 25a. The electric power supply outlet 25 is attached to an outlet mounting portion 30a from the back side of the mounting frame 30 via the mounting bracket 31. The three telephone jacks 24 are arranged in a vertical row, and are attached to a jack mounting portion 30b from the back side of the mounting frame 30.

The connection adaptor 26 is attached to the mounting frame 30 adjacently to a lower side of the portion where the telephone jacks 24 are mounted. The connection adaptor 26 is positioned by fitting a flange portion to the connection adaptor mounting portion 32 which is formed in one piece together with the mounting frame 30, and is held and accommodated by attaching the cover plate 23. In the embodiment described above, the connection adaptor mounting portion 32 is formed on the mounting frame 30. However, as shown in FIG. 3B, the connection adaptor mounting portion 32 may be provided on the cover plate 23. That is, the connection adaptor mounting portion 32 may be formed in one piece together with the inner side of the bulged portion 23b of the cover plate 23 so that the connection adaptor 26 is attached to the cover plate 23.

The optical connector 33 is attached directly to the end portion of the optical fiber cable 34 led out from the inside of the wall. The optical connector 33 is, for example, a sheath-clamping-type optical connector (e.g., a SC connector) having a lock function. The optical connector 33 may be an optical connector which is attached directly to the optical fiber cable 34 by inserting and fixedly bonding the optical fiber, which is exposed by removing the cable sheath of a distal end portion of the optical fiber cable 34, directly into a ferrule and by clamping the cable sheath part. Alternatively, the optical connector 33 may be an optical connector which can be attached directly to the optical fiber cable 34 by optically butting the coated optical fiber of the optical fiber cable 34 against a ferrule, in which a short optical fiber is housed, using a mechanical splice member, and by clamping the cable sheath part.

Figure 4:
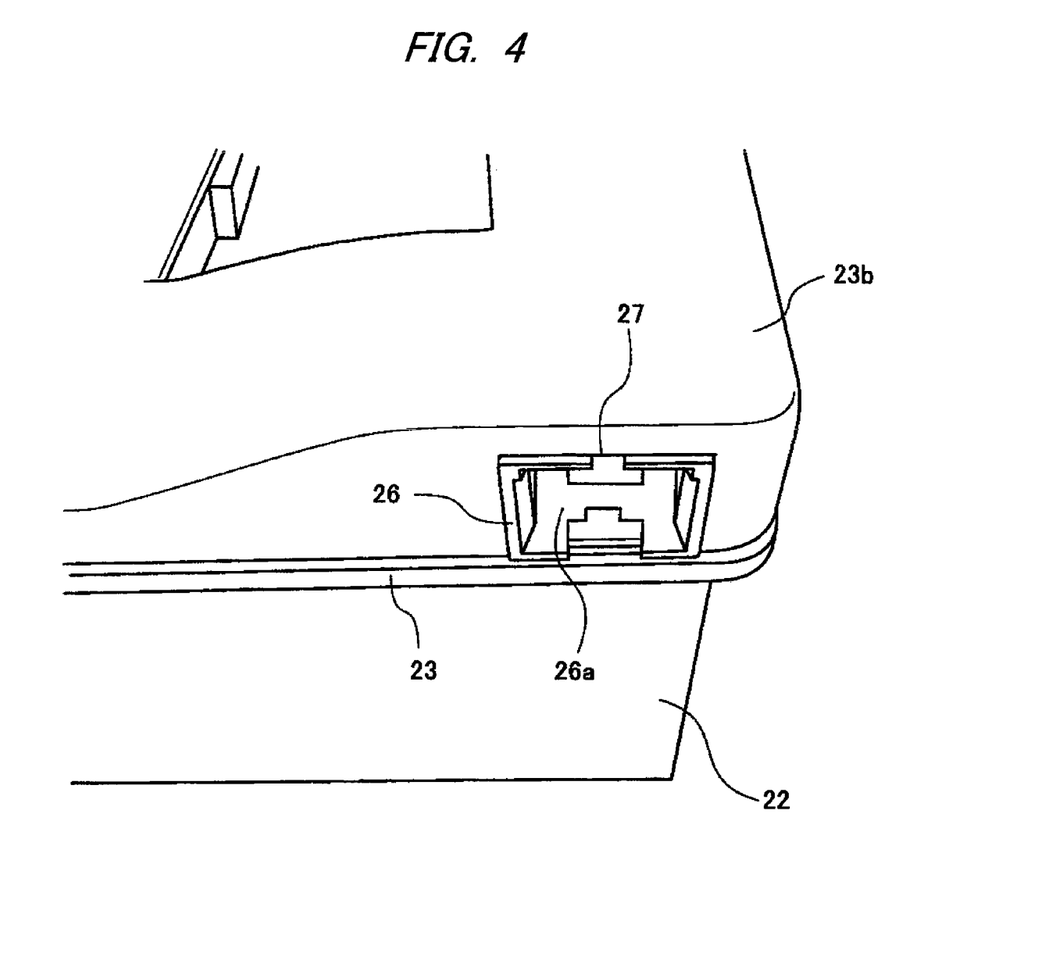
FIG. 4 is a partially enlarged view showing a bottom face portion of the outlet device.

As shown in FIG. 4, the opening 27 is formed in the bottom face portion of the outlet device. It is therefore possible to completely accommodate the connection adaptor 26 inside the cover plate 23 so that it cannot be seen from the outside, whereby the appearance of the outlet device can be improved. Alternatively, a part of the connection adaptor 26 (usually colored blue) may be exposed to the outside of the cover plate 23 so that the presence of the optical connection port 26a can be recognized from the outside. These configurations can be selectively adopted in accordance with harmony with a room and aesthetic view.

According to the embodiments of the present invention, the optical connection port 26a is provided in the bottom part of the cover plate 23 so as to be oriented downward. Therefore, it is usually rare to look into the optical connection port 26a. However, in order to prevent a direct viewing of light in a case in which small children accidentally looks in, the optical connection port 26a with a shutter plate over the optical connection port 26a may be used.

Aside from information communication using the optical fiber cable, a communication carrier sometimes transmit an optical signal having a specific wavelength (e.g., a wavelength of 1.65 μm) for the purpose of monitoring disconnection or the like in the optical fiber. It is therefore necessary to provide a filter for blocking the monitoring light. Thus, a connection adaptor 26 having a filtering function for blocking the specific wavelength may be used. In this case, it is not required to provide a specific space for accommodating the filter, and a filter connecting work can be omitted.

While embodiments of the present invention have been described above, it will be apparent to those skilled in the art that various changes or modifications can be made therein without departing from the spirit and scope of the present invention.

The present application is based on Japanese Patent Application No. 2007-010151 filed on Jan. 19, 2007, the content of which is incorporated by reference herein.

INDUSTRIAL APPLICABILITY

According to the present invention, it is possible to provide a compact outlet device which does not require a space for accommodating a surplus length portion of an optical fiber cable. Further, according to the present invention, it is possible to provide optical interconnection and an optical connection port without giving influence to electric wiring and electric connection ports. It is therefore possible to provide an outlet device in which connections can be easily made as a whole.

The invention claimed is:

1. An outlet device to be arranged on a wall surface, the outlet device comprising:
   an outlet box in which an electric wiring and an optical interconnection are to be accommodated; and
   a cover plate which covers the outlet box, wherein:
   the cover plate comprises:
      a plate surface;
      opening sections formed, in a center portion of the plate surface, to expose frontwardly electric connection ports of a telephone jack and an electric power supply outlet through the opening sections; and
      a bulged portion formed, on one of left and right side portions of the plate surface, to bulge frontward from the plate surface,
   the bulged portion accommodates a connection adaptor to which an optical connector, which is attached directly to an end portion of an optical fiber, is fitted, and comprises a bottom face having an opening formed therein to expose downwardly an optical connection port of the connection adaptor through the opening, and
   the cover plate is configured to be mountable on the outlet box, at least, at two positions rotated 180 degrees apart.

2. The outlet device according to claim 1, wherein the bulged portion further comprises a top face formed with another opening.

3. The outlet device according to claim 1, wherein:
   the opening sections are formed in the plate surface, and the bulged portion is formed adjacently to the opening sections.

4. The outlet device according to claim 1, wherein the bottom face of the bulged portion is orthogonal to the plate surface.

5. The outlet device according to claim 1, wherein the bulged portion is formed to extend from a lower end to an upper end of the cover plate.

6. The outlet device according to claim 1, wherein the opening sections have a same shape, respectively so that the cover plate is mountable on the outlet box at two positions rotated 180 degrees apart.

7. The outlet device according to claim 1, wherein the cover plate is plane-symmetric about a horizontal plane, which passes through a section of the cover plate at a center in an up-and-down direction.

8. The outlet device according to claim 1, further comprising a mounting frame to which at least one of the telephone jack and the electric power supply outlet is to be attached,
wherein the mounting frame is disposed between the outlet box and the cover plate, and is fixed to the outlet box.

9. The outlet device according to claim 8, further comprising a mounting portion to which the connection adaptor is to be attached,
wherein the mounting portion is formed in one piece together with the mounting frame.

10. The outlet device according to claim 1, further comprising a mounting portion to which the connection adaptor is to be attached,
wherein the mounting portion is formed in one piece together with the cover plate.

11. The outlet device according to claim 1, wherein the cover plate including the bulged portion is formed as one piece.

12. An outlet device to be arranged on a wall surface, the outlet device comprising:
an outlet box in which an electric wiring and an optical interconnection are to be accommodated; and
a cover plate which covers the outlet box, wherein:
the cover plate comprises:
a plate surface;
opening sections formed, in a center portion of the plate surface, to expose frontwardly electric connection ports of a telephone jack and an electric power supply outlet through the opening sections, and
a bulged portion formed, on one of left and right side portions of the plate surface, to bulge frontward from the plate surface,
the bulged portion accommodates a connection adaptor to which an optical connector, which is attached directly to an end portion of an optical fiber, is fitted,
the bulged portion is formed adjacently to the opening sections so as to extend from a lower end to an upper end of the cover plate,
the bulged portion comprises a bottom face having an opening formed therein to expose downwardly an optical connection port of the connection adaptor through the opening, and a top face formed with another opening, the bottom face being orthogonal to the plate surface,
the cover plate is configured to be mountable on the outlet box, at least, at two positions rotated 180 degrees apart.

13. The outlet device according to claim 12, further comprising a mounting frame to which at least one of the telephone jack and the electric power supply outlet is to be attached,
wherein the mounting frame is disposed between the outlet box and the cover plate, and is fixed to the outlet box.

14. The outlet device according to claim 13, further comprising a mounting portion to which the connection adaptor is to be attached,
wherein the mounting portion is formed in one piece together with the mounting frame.

15. The outlet device according to claim 12, wherein the cover plate is plane-symmetric about a horizontal plane, which passes through a section of the cover plate at a center in an up-and-down direction.

16. The outlet device according to claim 12, further comprising a mounting portion to which the connection adaptor is to be attached,
wherein the mounting portion is formed in one piece together with the cover plate.

17. The outlet device according to claim 12, wherein the cover plate including the bulged portion is formed as one piece.

18. The outlet device according to claim 12, wherein the opening sections have a same shape, respectively so that the cover plate is mountable on the outlet box at two positions rotated 180 degrees apart.

* * * * *